United States Patent
Zhang et al.

(10) Patent No.: US 12,248,625 B2
(45) Date of Patent: Mar. 11, 2025

(54) MAP-AIDED INERTIAL ODOMETRY WITH NEURAL NETWORK FOR AUGMENTED REALITY DEVICES

(71) Applicant: GOOGLE LLC, Mountain View, CA (US)

(72) Inventors: Qiyue Zhang, Santa Clara, CA (US); Luca Ballan, San Jose, CA (US); Hongsheng Yu, Sunnyvale, CA (US); Fengtao Fan, Sunnyvale, CA (US); Mahesh Ramachandran, Dublin, CA (US); Chao Guo, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/527,953

(22) Filed: Dec. 4, 2023

(65) Prior Publication Data

US 2024/0176419 A1   May 30, 2024

Related U.S. Application Data

(63) Continuation of application No. 18/058,573, filed on Nov. 23, 2022, now Pat. No. 11,847,259.

(51) Int. Cl.
*G06F 3/01* (2006.01)
*G06T 19/00* (2011.01)

(52) U.S. Cl.
CPC ............ *G06F 3/013* (2013.01); *G06T 19/003* (2013.01); *G06T 2207/20084* (2013.01)

(58) Field of Classification Search
CPC . G02B 27/0093; G02B 27/017; G06F 1/1694; G06F 3/011; G06F 3/014;
(Continued)

(56) References Cited

U.S. PATENT DOCUMENTS

| | | | |
|---|---|---|---|
| 9,947,100 | B2 | 4/2018 | Moeglein et al. |
| 10,390,003 | B1 | 8/2019 | Liu et al. |

(Continued)

FOREIGN PATENT DOCUMENTS

| | | |
|---|---|---|
| JP | 2016033474 A | 3/2016 |
| JP | 2019023865 A | 2/2019 |

(Continued)

OTHER PUBLICATIONS

U.S. Appl. No. 18/058,573, filed Nov. 23, 2022, Allowed.
(Continued)

*Primary Examiner* — Nelson M Rosario
(74) *Attorney, Agent, or Firm* — Brake Hughes Bellermann LLP (57) ABSTRACT

Techniques of providing continual augmented reality navigation include combining first and second 6DoF poses from, respectively, a localization from a map in a vicinity of a location to an image and from predicted 6DoF poses based on IMU data. The first 6DoF pose is based on a visual positioning system that uses map data from a vicinity of a location combined with an image from the world-facing camera of the AR smartglasses that provides 6DoF pose in world coordinates independent of the IMU. The second 6DoF pose is based on compensated rotational velocity and acceleration measurements derived from IMU intrinsic values.

22 Claims, 9 Drawing Sheets

(58) Field of Classification Search
CPC .. G06F 18/2413; G06F 2218/00; G06F 1/163; G06F 1/1686; G06F 3/0304; G06F 3/0425; G06F 3/04815; G06F 3/0482; G06F 3/04845; G06N 20/00; G06N 3/045; G06N 20/10; G06T 7/80; G06T 2207/20182; G06T 11/001; G06T 19/006; G06T 19/20; G06T 2200/24; G06T 2215/16; G06T 2219/2012; G06V 10/60; G06V 20/20; G01C 21/188; G01C 25/00

See application file for complete search history.

(56) References Cited

U.S. PATENT DOCUMENTS

| | | | |
|---|---|---|---|
| 11,113,894 | B1 | 9/2021 | Price et al. |
| 11,486,707 | B2 * | 11/2022 | Roumeliotis .......... G01C 21/16 |
| 11,625,092 | B2 | 4/2023 | Kim et al. |
| 2012/0300020 | A1 | 11/2012 | Arth et al. |
| 2015/0098614 | A1 | 4/2015 | Gee et al. |
| 2016/0033284 | A1 | 2/2016 | Sato |
| 2016/0225191 | A1 | 8/2016 | Mullins |
| 2018/0188032 | A1 | 7/2018 | Ramanandan et al. |
| 2019/0146598 | A1 | 5/2019 | Peri |
| 2021/0004979 | A1 * | 1/2021 | Valentin ................... G06T 7/579 |
| 2021/0223858 | A1 | 7/2021 | Barak et al. |
| 2022/0306089 | A1 | 9/2022 | Seth |
| 2022/0374072 | A1 | 11/2022 | Wu |
| 2023/0132644 | A1 | 5/2023 | Melim et al. |
| 2023/0133574 | A1 | 5/2023 | Kim et al. |
| 2023/0289027 | A1 * | 9/2023 | Aranda ............... G06F 3/04815 |

FOREIGN PATENT DOCUMENTS

| | | |
|---|---|---|
| KR | 20160063367 A | 6/2016 |
| KR | 20210128269 A | 10/2021 |
| KR | 20220039110 A | 3/2022 |
| WO | 2015192117 A1 | 12/2015 |

OTHER PUBLICATIONS

Lang, et al., "A New Combination of Vision-Based and Inertial Tracking for Fully Mobile, Wearable, and Real-Time Operation", 26th Workshop of the AAPR/OAGM, OCG Schriftenreihe, Band 160, Graz, Austria, Sep. 2002, 8 pages.

Yoon, et al., "Deep 6-DOF Head Motion Prediction for Latecy in Lightweight Augmented Reality Glasses", IEEE International Conference on Consumer Electronics (ICCE), 2022, 6 pages.

Office Action with English translation for Korean Application No. 10-2023-0157265, mailed Apr. 30, 2024, 11 pages.

Extended European Search Report for European Application No. 23211563.4, mailed May 2, 2024, 8 pages.

Office Action for Japanese Application No. 2023-197406, with English Translation, mailed May 7, 2024, 9 pages.

* cited by examiner

MAP-AIDED INERTIAL ODOMETRY WITH NEURAL NETWORK FOR AUGMENTED REALITY DEVICES

CROSS REFERENCE TO RELATED APPLICATION

This application is a continuation of U.S. application Ser. No. 18/058,573, filed Nov. 23, 2022, the disclosure of which is incorporated herein by reference in its entirety.

BACKGROUND

Visual odometry is a computer vision technique for estimating a six-degree-of-freedom (6DoF) pose (position and orientation)—and in some cases, velocity—of a camera moving relative to a starting position. When movement is tracked, the camera performs navigation through a region. Visual odometry works by analyzing sequential images from the camera and tracking objects in the images that appear in the sequential images.

Visual inertial odometry (VIO) is visual odometry performed using an inertial measurement unit (IMU). An IMU has an accelerometer and gyroscope and outputs acceleration and rotational velocity. To convert these to a 6DoF pose, there is an integration module that performs two integration operations to convert acceleration to a position and one integration operation to convert the rotational velocity to an orientation. Nevertheless, because of drift error in the IMU, and the integration operations exacerbating the drift error, the data output from the IMU will lead to a pose with a large level of error.

To address this error, conventional VIO updates the images frequently so that the changes measured by the IMU between sequential images is small. In some cases, a conventional VIO takes images at a rate of 10 Hz, i.e., every 0.1 second.

SUMMARY

Implementations described herein are related to inertial odometry for navigation in an augmented reality (AR) system. Conventional VIO requires the frequent generation of images from a world-facing camera on an AR smartglasses frame. Such frequent generation of images may present a problem in that the battery powering the AR smartglasses might be drained quickly. To mitigate the drift error of the IMU while conserving battery, an improved inertial odometry provides localization from a map in a vicinity of a location to an image to derive a first 6DoF pose of a camera. This first 6DoF pose is combined with a second, predicted 6DoF pose based on compensated rotational velocity and acceleration measurements derived from IMU intrinsic values (e.g., gyro bias, gyro misalignment). Each of the first and second 6DoF poses are input into an extended Kalman filter (EKF) to provide a corrected 6DoF pose and the IMU intrinsic values. In some implementations, the second 6DoF pose is input into the EKF at a rate of between 10 Hz and 200 Hz, while the first 6DoF pose is input into the EKF at a rate of 1 Hz or less. In some implementations, the second DoF pose is predicted via a neural network. The resources used by the neural network are far less—even at 200 Hz—than that used by the camera at 10 Hz. In this way, the inertial odometry, aided by a map and a neural network/prediction engine, is able to provide accurate navigation while using far less computational resources, resulting in longer battery life for the AR smartglasses.

In one general aspect, a method can include receiving inertial measurement unit (IMU) data from an IMU, the IMU data including values of a rotational velocity, an acceleration, and a temperature, the IMU being connected to a world-facing camera on a frame of a smartglasses device in a location. The method can also include receiving image data representing an image of a scene at the location. The method can further include generating first six-degree-of-freedom pose data of the IMU based on the image data and a map of a vicinity of the location, the first six-degree-of-freedom pose data representing a first position and orientation of the IMU in a world coordinate system. The method can further include generating second six-degree-of-freedom pose data of the IMU based on the values of the rotational velocity and the acceleration, the second six-degree-of-freedom pose data representing a second position and orientation of the IMU in the world coordinate system. The method can further include generating corrected six-degree-of-freedom pose data based on the first six-degree-of-freedom pose data and the second six-degree-of-freedom pose data.

In another general aspect, a computer program product comprises a non-transitory storage medium, the computer program product including code that, when executed by processing circuitry, causes the processing circuitry to perform a method. The method can include receiving inertial measurement unit (IMU) data from an IMU, the IMU data including values of a rotational velocity, an acceleration, and a temperature, the IMU being connected to a world-facing camera on a frame of a smartglasses device in a location. The method can also include receiving image data representing an image of a scene at the location. The method can further include generating first six-degree-of-freedom pose data of the IMU based on the image data and a map of a vicinity of the location, the first six-degree-of-freedom pose data representing a first position and orientation of the IMU in a world coordinate system. The method can further include generating second six-degree-of-freedom pose data of the IMU based on the values of the rotational velocity and the acceleration, the second six-degree-of-freedom pose data representing a second position and orientation of the IMU in the world coordinate system. The method can further include generating corrected six-degree-of-freedom pose data based on the first six-degree-of-freedom pose data and the second six-degree-of-freedom pose data.

In another general aspect, an apparatus comprises memory, and processing circuitry coupled to the memory. The processing circuitry can be configured to receive inertial measurement unit (IMU) data from an IMU, the IMU data including values of a rotational velocity, an acceleration, and a temperature, the IMU being connected to a world-facing camera on a frame of a smartglasses device in a location. The processing circuitry can also be configured to receive image data representing an image of a scene at the location. The processing circuitry can further be configured to generate first six-degree-of-freedom pose data of the IMU based on the image data and a map of a vicinity of the location, the first six-degree-of-freedom pose data representing a first position and orientation of the IMU in a world coordinate system. The processing circuitry can further be configured to generate second six-degree-of-freedom pose data of the IMU based on the values of the rotational velocity and the acceleration, the first six-degree-of-freedom pose data of the IMU representing a second position and orientation of the IMU in the world coordinate system. The processing circuitry can further be configured to generate corrected sixdegree-of-freedom pose data based on the first six-degree-of-freedom pose data of the IMU and the six-degree-of-freedom pose data.

The details of one or more implementations are set forth in the accompanying drawings and the description below. Other features will be apparent from the description and drawings, and from the claims.

BRIEF DESCRIPTION OF THE DRAWINGS

FIG. 1B is a front view.

DETAILED DESCRIPTION

This disclosure relates to the inertial odometry for navigation using AR smartglasses. Conventional VIO requires the frequent generation of images from a world-facing camera on an AR smartglasses frame. A technical problem with such frequent generation of images is that the battery powering the AR smartglasses might be drained quickly.

To mitigate the drift error of the IMU, and in accordance with the implementations described herein, a technical solution to the above-described technical problem combines first and second 6DoF poses from, respectively, a localization from a map in a vicinity of a location to an image and from predicted 6DoF poses based on IMU data.

The first localization-based 6DoF pose is based on a visual positioning system that uses map data from a vicinity of a location (e.g., StreetView™ map from Google, Inc.) combined with an image from the world-facing camera of the AR smartglasses that provides 6DoF pose in world coordinates independent of the IMU. In some implementations, rather than updating the images at 10 Hz, the images are updated at <1 Hz. This is achievable because the inertial odometry is no longer dependent on sequential images but it rather based on a combination of map localization data and more frequently updated, predicted 6DoF pose data.

The second 6DoF pose is based on compensated rotational velocity and acceleration measurements derived from IMU intrinsic values (e.g., gyro bias, gyro misalignment). In some implementations, rather than integrating the compensated rotational velocity and acceleration values to produce the 6DoF pose, the compensated rotational velocity and acceleration values are input into a prediction engine that predicts 6DoF pose directly from the compensated rotational velocity and acceleration values. In some implementations, the prediction engine is a neural network. In some implementations, the second 6DoF pose is updated at a frequency of between 10 Hz and 200 Hz. In some implementations, the prediction engine includes a convolutional neural network.

Each of the first and second 6DoF poses can be input into an extended Kalman filter (EKF) to provide a corrected 6DoF pose and the IMU intrinsic values. The EKF updates a state and a covariance matrix based on a set of measurements and updating equations. The state of the EKF to be estimated in this case is a 27-element state vector that has nine, three-element vector components that include position, orientation, and velocity in world coordinate frame, gyro and accelerometer biases, gyro and accelerometer scale factors, gyro and accelerometer misalignment, and accelerometer frame to world frame transform. The covariance matrix represents an error in the state estimate and decreases with successive updates so that when the magnitude of the covariance matrix falls below a threshold, the state estimate is final for an epoch.

In some implementations, elements of the state vector such as gyro and accelerometer biases, gyro and accelerometer scale factors, and gyro and accelerometer misalignment, represent IMU intrinsic parameters. The IMU intrinsic parameters and their values may be fed back into an IMU output compensation module. The IMU output compensation module is configured to compensate the values of the rotational velocity and acceleration to correct for the drift error. These compensated values may then be used as input into the prediction engine and/or integration module.

A technical advantage of the technical solution just described is that the inertial odometry, aided by a map and a neural network/prediction engine, is able to provide accurate navigation while using far less computational resources, resulting in longer battery life for the AR smartglasses. This is possible because each of the updates to the second 6DoF pose from the prediction engine use far less computational resources than analyzing sequential images at 10 Hz, and the images generated herein are generated much less frequently, e.g., <1 Hz.

Figure 1A:
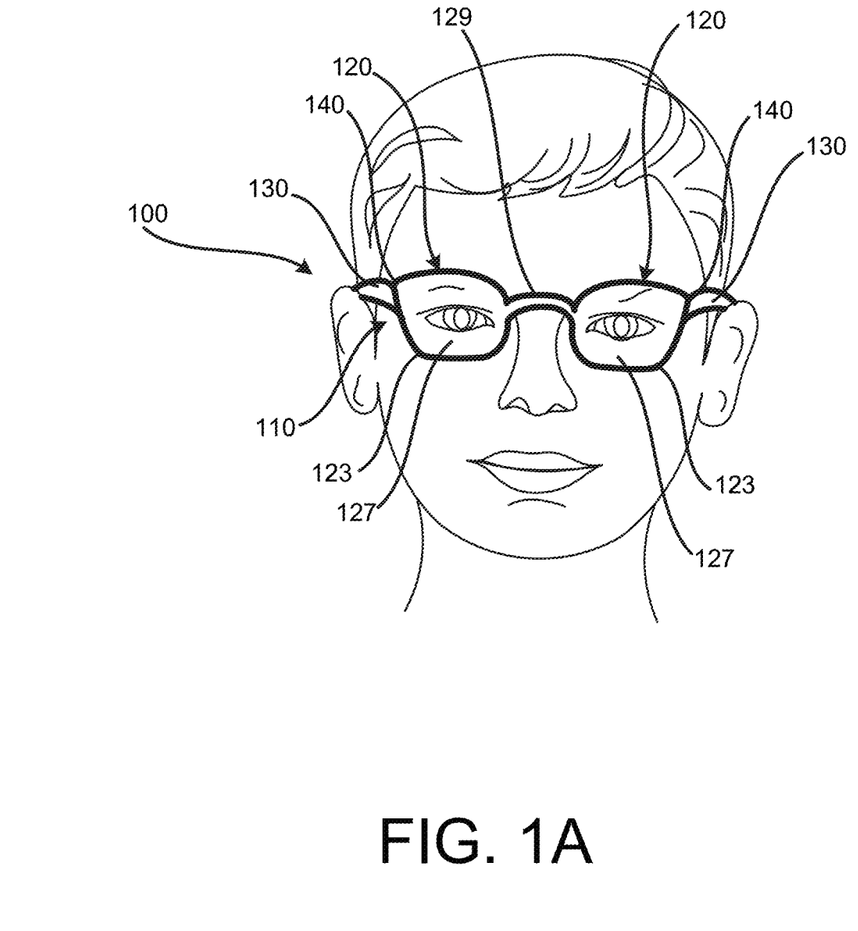
FIG. 1A illustrates an example head mounted wearable device worn by a user.
Figure 1B:
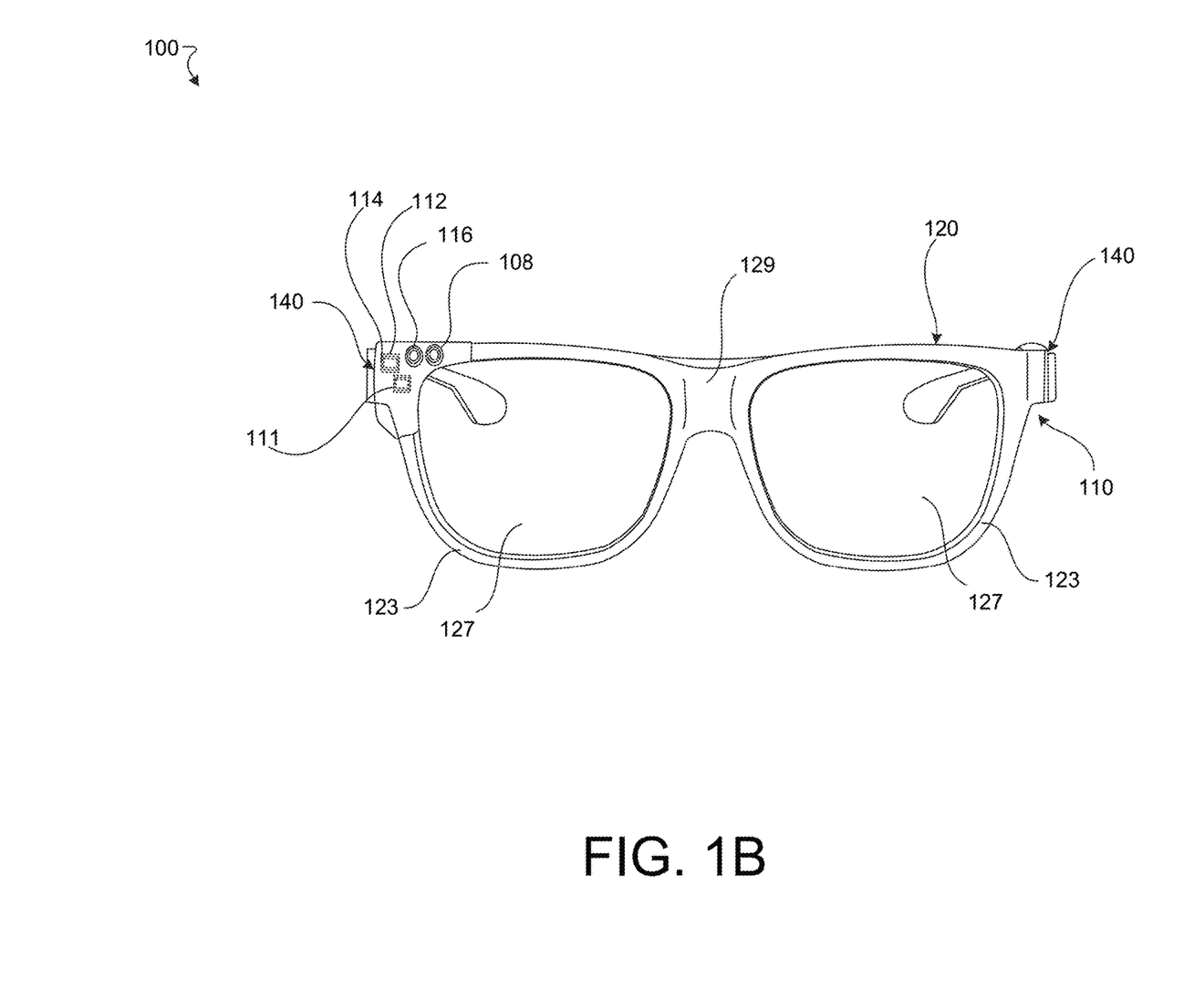
Figure 1C:
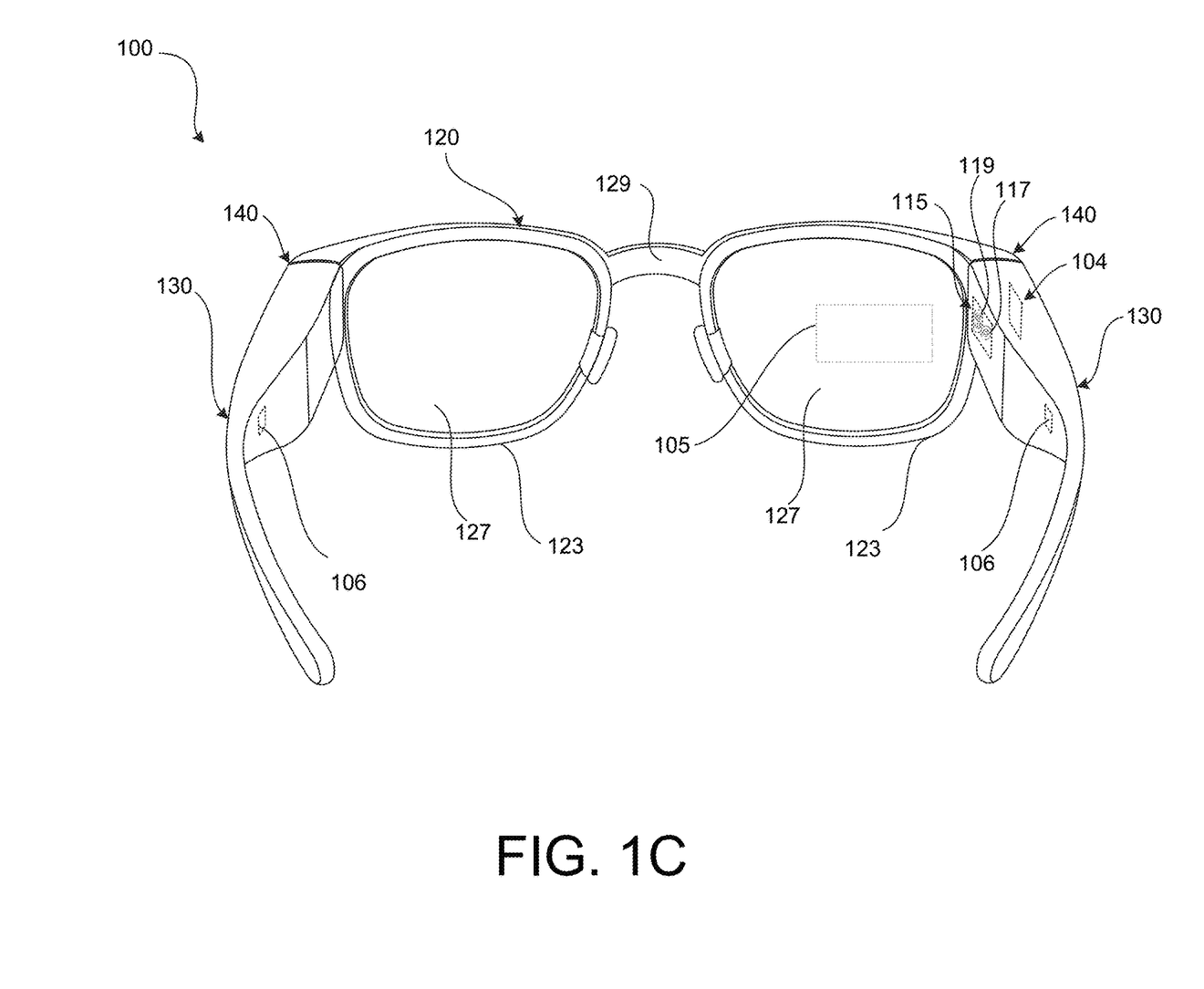
FIG. 1C is a rear view of the example head mounted wearable device shown in FIG. 1A.

FIG. 1A illustrates a user wearing an example smartglasses 100, including display capability, eye/gaze tracking capability, and computing/processing capability. FIG. 1B is a front view, and FIG. 1C is a rear view, of the example smartglasses 100 shown in FIG. 1A. The example smartglasses 100 includes a frame 110. The frame 110 includes a front frame portion 120, and a pair of temple arm portions 130 rotatably coupled to the front frame portion 120 by respective hinge portions 140. The front frame portion 120 includes rim portions 123 surrounding respective optical portions in the form of lenses 127, with a bridge portion 129 connecting the rim portions 123. The temple arm portions 130 are coupled, for example, pivotably or rotatably coupled, to the front frame portion 120 at peripheral portions of the respective rim portions 123. In some examples, the lenses 127 are corrective/prescription lenses. In some examples, the lenses 127 are an optical material including glass and/or plastic portions that do not necessarily incorporate corrective/prescription parameters.

In some examples, the smartglasses 100 includes a display device 104 that can output visual content, for example, at an output coupler 105, so that the visual content is visible to the user. In the example shown in FIGS. 1B and 1C, the display device 104 is provided in one of the two arm portions 130, simply for purposes of discussion and illustration. Display devices 104 may be provided in each of the two arm portions 130 to provide for binocular output of content. In some examples, the display device 104 may be a see-through near eye display. In some examples, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 127, next to content (for example, digital images, user interface elements, virtual content, and the like) output by the display device 104. In some implementations, waveguide optics may be used to depict content on the display device 104.

In some examples, the smartglasses 100 includes one or more of an audio output device 106 (such as, for example, one or more speakers), an illumination device 108, a sensing system 111, a control system 112, at least one processor 114, and an outward facing image sensor, or world-facing camera 116. In some examples, the sensing system 111 may include various sensing devices and the control system 112 may include various control system devices including, for example, one or more processors 114 operably coupled to the components of the control system 112. In some examples, the control system 112 may include a communication module providing for communication and exchange of information between the smartglasses 100 and other external devices. In some examples, the head mounted smartglasses 100 includes a gaze tracking device 115 to detect and track eye gaze direction and movement. Data captured by the gaze tracking device 115 may be processed to detect and track gaze direction and movement as a user input. In the example shown in FIGS. 1B and 1C, the gaze tracking device 115 is provided in one of the two arm portions 130, simply for purposes of discussion and illustration. In the example arrangement shown in FIGS. 1B and 1C, the gaze tracking device 115 is provided in the same arm portion 130 as the display device 104, so that user eye gaze can be tracked not only with respect to objects in the physical environment, but also with respect to the content output for display by the display device 104. In some examples, gaze, or gaze tracking devices 115 may be provided in each of the two arm portions 130 to provide for gaze tracking of each of the two eyes of the user. In some examples, display devices 104 may be provided in each of the two arm portions 130 to provide for binocular display of visual content.

Figure 2A:
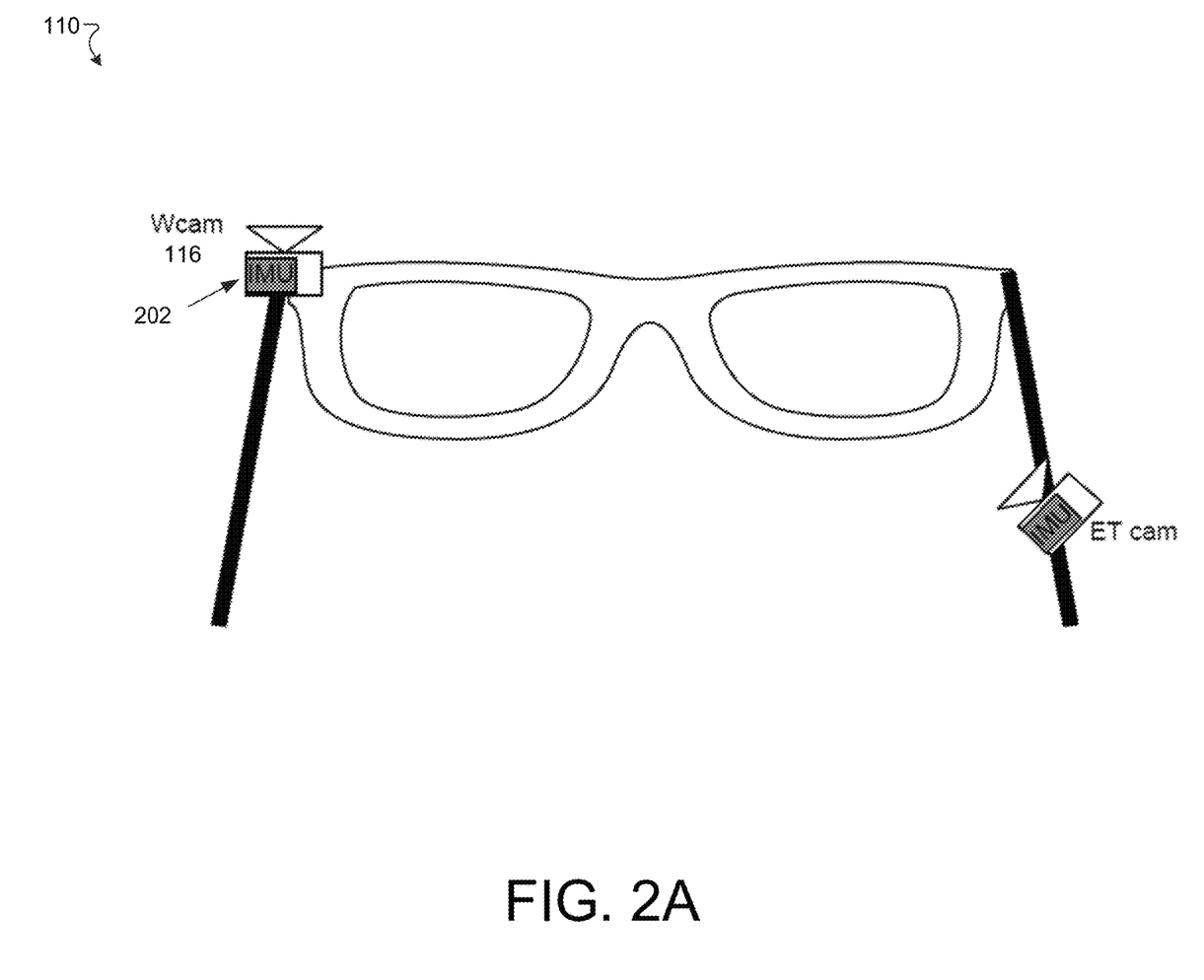
FIG. 2A is diagram illustrating an example a world-facing camera with associated IMU on a smartglasses frame.

FIG. 2A is diagram illustrating an example a world-facing camera 116 on a smartglasses frame 110. As shown in FIG. 2A, the world-facing camera 116 has an attached inertial measurement unit (IMU) 202. The IMU 202 includes a set of gyros configured to measure rotational velocity and an accelerometer configured to measure an acceleration of camera 116 as the camera moves with the head and/or body or the user.

Figure 2B:
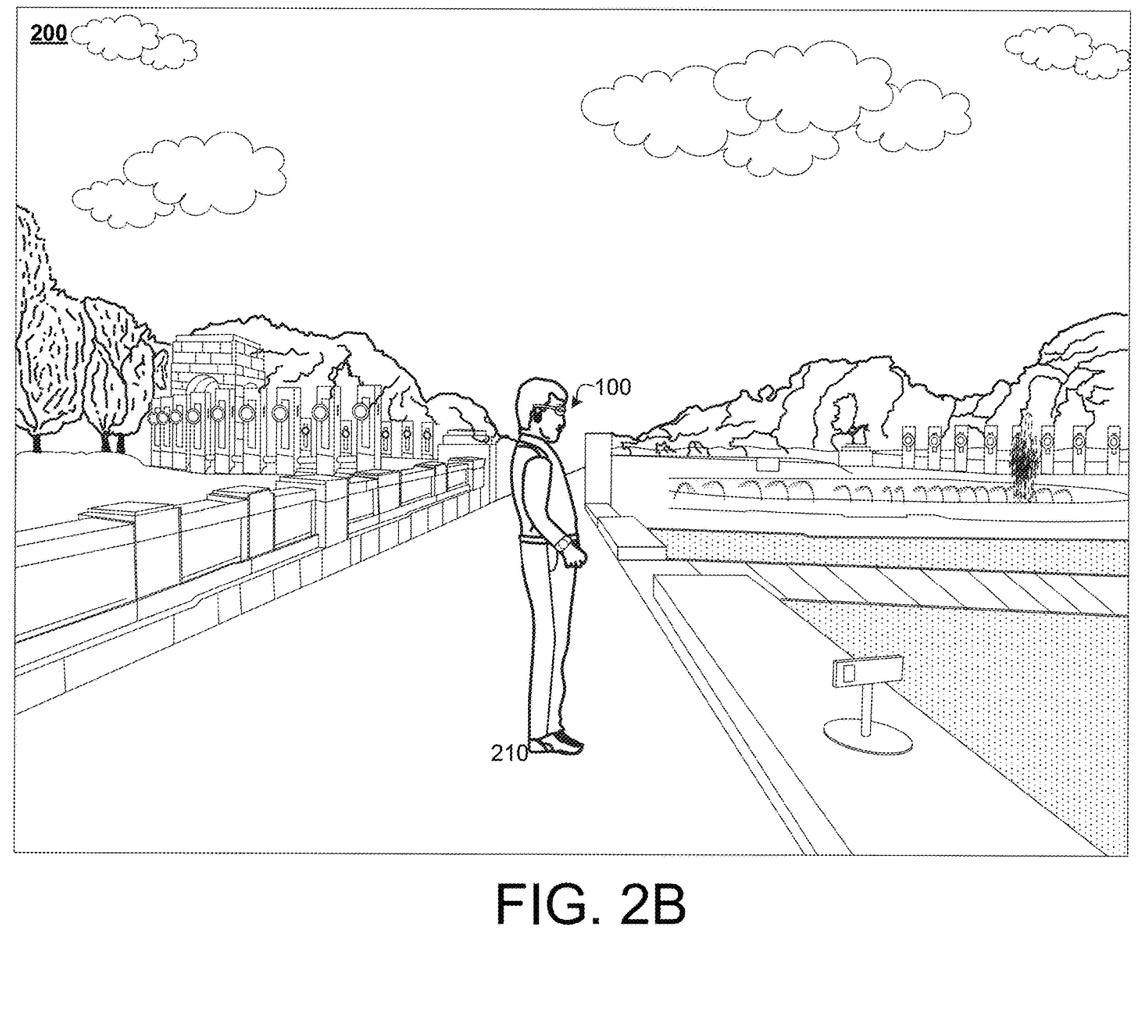
FIG. 2B is a diagram illustrating an example scene in which a user may perform inertial odometry using the AR smartglasses.

FIG. 2B is a diagram illustrating an example scene 200 in which a user may perform inertial odometry using the AR smartglasses 100. As shown in FIG. 2B, the user looks at the scene 200 at a location 210 within the scene 200. As the user looks at the scene 200 from the location 210, the world-facing camera 116 displays a portion of the scene 200 onto the display; that portion is dependent on the 6DoF pose of the camera 116 in the world coordinate system of the scene. As the user moves through the scene 200, the camera may provide navigation (i.e., informing the user which direction they are moving within the scene 200) based on data from the IMU 202.

Figure 2C:
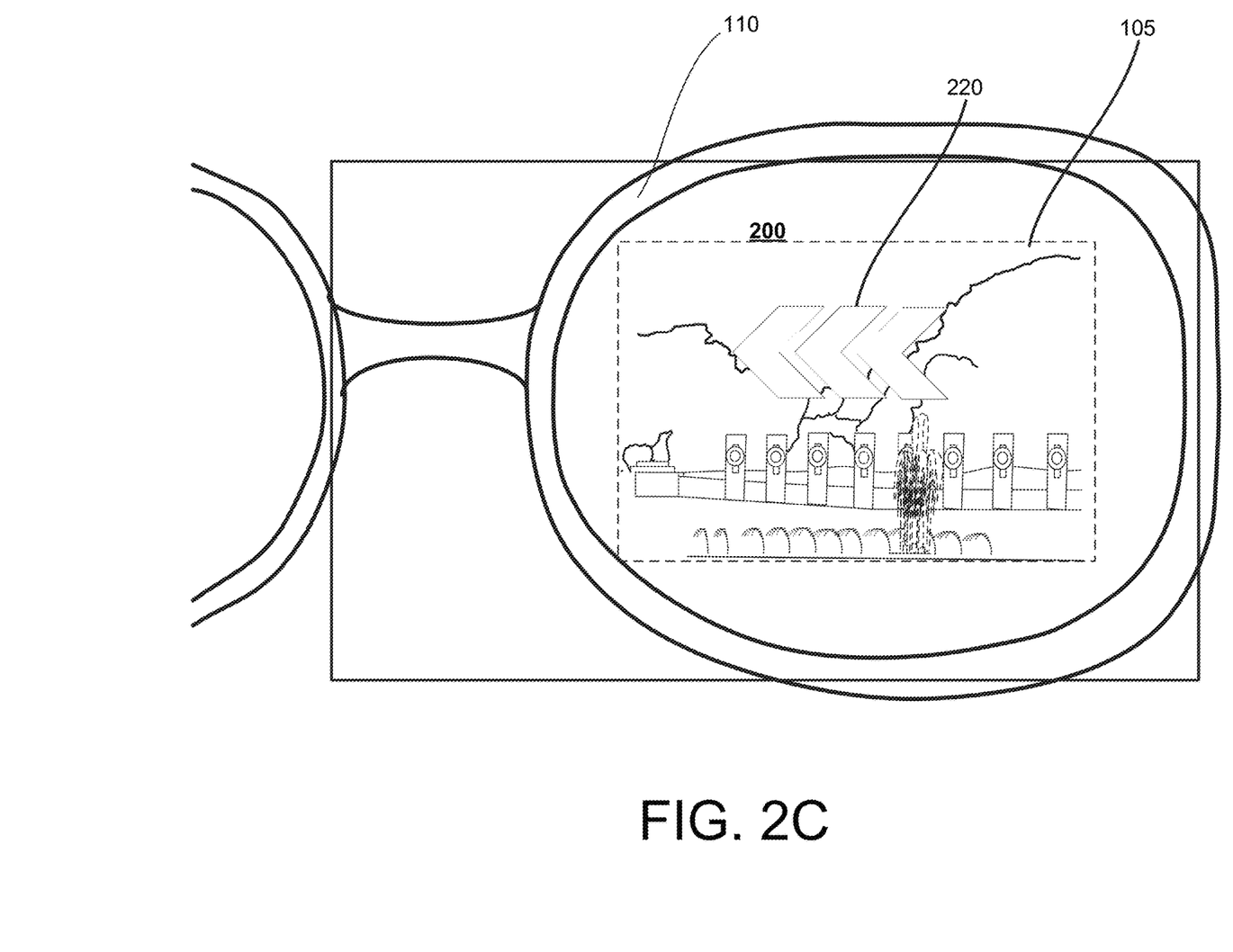
FIG. 2C is a diagram illustrating an example scene as viewed in the AR smartglasses via the world-facing camera.

FIG. 2C is a diagram illustrating an example scene 200 as viewed in the AR smartglasses 100 via the world-facing camera 116. The AR smartglasses 100 projects an image from the world-facing camera into the display. If the user were to move in a westerly direction, data from the IMU 202 may then indicate that the user is moving in a westerly direction. The smartglasses 100 may then superpose, e.g., an arrow 220 onto the display over the image that lets the user know the direction in which they move within the scene 200. In this way, the smartglasses may provide navigation using inertial odometry.

Figure 3:
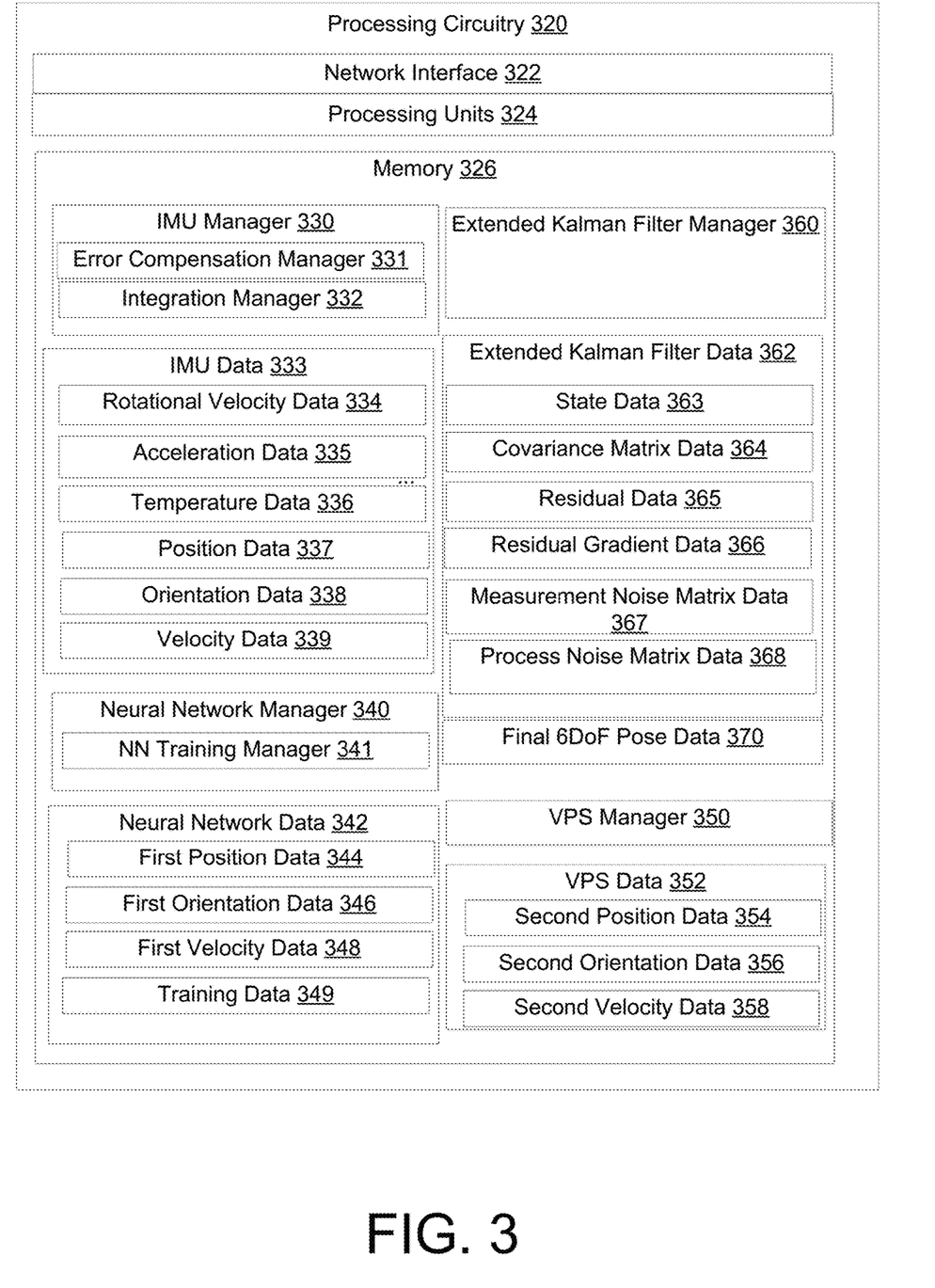
FIG. 3 is a diagram illustrating an example apparatus for performing the map-aided inertial odometry per the improved techniques described herein.

FIG. 3 is a diagram that illustrates an example of processing circuitry 320. The processing circuitry 320 includes a network interface 322, one or more processing units 324, and nontransitory memory 326. The network interface 322 includes, for example, Ethernet adaptors, Token Ring adaptors, Bluetooth adaptors, WiFi adaptors, NFC adaptors, and the like, for converting electronic and/or optical signals received from the network to electronic form for use by the processing circuitry 320. The set of processing units 324 include one or more processing chips and/or assemblies. The memory 326 includes both volatile memory (e.g., RAM) and non-volatile memory, such as one or more ROMs, disk drives, solid state drives, and the like. The set of processing units 324 and the memory 326 together form processing circuitry, which is configured and arranged to carry out various methods and functions as described herein.

In some implementations, one or more of the components of the processing circuitry 320 can be, or can include processors (e.g., processing units 324) configured to process instructions stored in the memory 326. Examples of such instructions as depicted in FIG. 3 include IMU manager 330, neural network manager 340, visual positioning system manager 350, and extended Kalman filter manager 360. Further, as illustrated in FIG. 3, the memory 326 is configured to store various data, which is described with respect to the respective managers that use such data.

The IMU manager 330 is configured to obtain IMU data 333. In some implementations, the IMU manager 330 obtains the IMU data 333 wirelessly. As shown in FIG. 3, the IMU manager 330 includes an error compensation manager 331 and an integration manager 332.

The error compensation manager 331 is configured to receive IMU intrinsic parameter values from the EKF manager 360. The error compensation manager 331 is further configured to receive IMU output (IMU data 333) from, e.g., IMU manager 330, and use the IMU intrinsic parameter values to compensate the IMU output for drift error. The error compensation manager 331 is then configured to, after performing the error compensation, produce the IMU data 333.

The integration manager 332 is configured to perform integration operations (e.g., summing over time-dependent values) on the IMU data 333. Notably, the rotational velocity data 334 is integrated over time to produce an orientation. Moreover, the acceleration data 335 is integrated over time twice to produce a position. Accordingly, the integration manager 332 produces a 6DoF pose (position and orientation) from the IMU output, i.e., rotational velocity data 334 and acceleration data 335.

The IMU data 333 represents the gyro and accelerometer measurements, rotational velocity data 334 and acceleration data 335 in a world frame (as opposed to a local frame, i.e., frame of the IMU), compensated for drift error using the IMU intrinsic parameter values determined by the EKF manager 360. Moreover, IMU data 333 includes 6DoF pose and movement data, position data 337, orientation data 338, and velocity data 339, that are derived from the gyro and accelerometer measurements. Finally, in some implementations, the IMU data 333 also includes IMU temperature data 336; this may indicate further error in the rotational velocity data 334 and acceleration data 335.

The neural network manager 340 is configured to take as input the rotational velocity data 334 and acceleration data 335 and produce the neural network data 342 including second position data 344, second orientation data 346, and second velocity data 348. In some implementations, the input rotational velocity data 334 and acceleration data 335 are produced by the error compensation manager 331 acting on raw IMU output values, i.e., with errors compensated by IMU intrinsic parameter values. As shown in FIG. 3, the neural network manager 340 includes a neural network training manager 341.

The neural network training manager 341 is configured to take in training data 349 and produce the neural network data 342, including data concerning layers and cost functions and values. In some implementations, the training data 349 includes movement data taken from measurements of people wearing AR smartglasses and moving their heads and other parts of their bodies, as well as ground truth 6DoF pose data taken from those measurements. In some implementations, the training data 349 includes measured rotational velocities and accelerations from the movement, paired with measured 6DoF poses and velocities.

In addition, in some implementations, the neural network manager 340 uses historical data from the IMU to produce the first position data 344, first orientation data 346, and first velocity data 348. For example, the historical data is used to augment the training data 349 with maps of previous rotational velocities, accelerations, and temperatures to their resulting 6DoF pose and movement results and hence further refine the neural network.

In some implementations, the neural network represented by the neural network manager 340 is a convolutional neural network, with the layers being convolutional layers.

The visual positioning system (VPS) manager 350 is configured to take as input an image and a map of a region in the vicinity of the location of the image and produce VPS data 352, including first position data 354, first orientation data 356; in some implementations, the VPS data also includes first velocity data 358, i.e., 6DoF pose based on map localization in an image. In some implementations, the image is obtained with the world-facing camera (e.g., 116) on the frame of the AR smartglasses.

The map localization of the image is the determination of world coordinates of the 6DoF pose of the world-facing camera using the map. In some implementations, the map is a Google Maps Street View™. For example, the map localization may be accomplished using a system such as Google® Visual Positioning System or other similar maps.

In some implementations, the accuracy level of the VPS manager 350 in producing the VPS data 352 depends on the environment surrounding the location. For example, the accuracy requirements for indoor locations may be on the order of 1-10 cm, while the accuracy requirements for outdoor locations may be on the order of 1-10 m.

The extended Kalman filter (EKF) manager 360 is configured to produce estimates of the 6DoF pose based on the EKF data 362 and return final 6DoF pose data 370 for, e.g., navigating a user through a location.

The EKF data 362 represents the state and covariances that are updated by the EKF manager 360, as well as the residual and error terms that are part of the updating equations. As shown in FIG. 3, the EKF data 362 includes state data 363, covariance matrix data 364, residual data 365, residual gradient data 366, measurement noise matrix data 367, and process noise matrix data 368.

State data 363 represents the state x that is updated by the EKF manager 360. Here, the state x is a 1×30 array where $x=[v, p, q_g, q_a, b_g, b_a, s_g, s_a, m_g, m_a]$, where each 1×3 element is as follows:
 v is velocity in the world frame,
 p is position in the world frame,
 $q_g$ is orientation (represented by, e.g., Euler angles) of the gyro with respect to the world frame,
 $q_a$ is orientation of the accelerometer with respect to the world frame,
 $b_g$ is a gyro bias (intrinsic parameter),
 $b_a$ is an accelerometer bias (intrinsic parameter),
 $s_g$ is a gyro scale factor (intrinsic parameter),
 $s_a$ is an accelerometer scale factor (intrinsic parameter),
 $m_g$ is a gyro misalignment (intrinsic parameter), and
 $m_a$ is an accelerometer misalignment (intrinsic parameter).

Covariance matrix data 364 represents a 30×30 covariance matrix P, which is a measure of the accuracy of an estimate of the state x.

Residual data 366 represents a residual, or innovation vector, given here by $v_k = z_k - h(x_k, k)$, where $z_k$ is a measurement at the epoch k and $h(x_k, k)$ is a prediction at epoch k of the observation and is a function of the predicted state $x_k$ at epoch k. (Note that an epoch is a time interval over which an update occurs in the EKF.) For example, for the neural network observation $z_k = [p_{nk}, v_{nk}, q_{nk}] + n_1$, where $n_1$ is a neural network measurement error, i.e., noise, the predicted values are $h(x_k, k) = [p_k, v_k, q_k]$ and the innovation $v_k$ is the difference. The map observation is $z_k = [p_{mk}, q_{nk}] + m_1$, with the prediction $h(x_k, k) = [p_k, q_k]$; the innovation $v_k$ is the difference.

Residual gradient data 366 represents a 3×10 gradient H of the residual y(t) with respect to the state x.

Measurement noise matrix data 367 represents a 3×3 measurement noise matrix R. This represents the variances of the measurement noises.

Process noise matrix data 368 represents a 30×30 process noise matrix Q. This represents the model errors, such as the slow changes of the biases and the errors due to the linearization of the model.

The EKF manager 360 updates the state data 363 and covariance matrix data 364 through the following update equations.

$$HPH^T + R \mapsto S$$

$$PH^T S^{-1} \mapsto K$$

$$x - Ky \mapsto x(*)$$

$$(I - KH)P + Q \mapsto P(**)$$

Note that (*) is the state updating equation, while (**) is the covariance matrix updating equation. The magnitude of the covariance matrix P should grow smaller with each iteration until a tolerance has been achieved. When the tolerance has been achieved, the state is the final state, and the rotation matrix of the state provides the final 6DoF pose data 370.

It is noted that the observations from the neural network and the map may be provided to the EKF manager 360 at different frequencies. This is illustrated with respect to FIG. 4.

The components (e.g., modules, processing units 324) of processing circuitry 320 can be configured to operate based on one or more platforms (e.g., one or more similar or different platforms) that can include one or more types of hardware, software, firmware, operating systems, runtime libraries, and/or so forth. In some implementations, the components of the processing circuitry 320 can be configured to operate within a cluster of devices (e.g., a server farm). In such an implementation, the functionality and processing of the components of the processing circuitry 320 can be distributed to several devices of the cluster of devices.

The components of the processing circuitry 320 can be, or can include, any type of hardware and/or software configured to process attributes. In some implementations, one or more portions of the components shown in the components of the processing circuitry 320 in FIG. 3 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the processing circuitry 320 can be, or can include, a software module configured for execution by at least one processor (not shown). In some implementations, the functionality of the components can be included in different modules and/or different components than those shown in FIG. 3, including combining functionality illustrated as two components into a single component.

Although not shown, in some implementations, the components of the processing circuitry 320 (or portions thereof) can be configured to operate within, for example, a data center (e.g., a cloud computing environment), a computer system, one or more server/host devices, and/or so forth. In some implementations, the components of the processing circuitry 320 (or portions thereof) can be configured to operate within a network. Thus, the components of the processing circuitry 320 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the search system can be, or can include, processors configured to process instructions stored in a memory. For example, IMU manager 330 (and/or a portion thereof), neural network manager 340 (and/or a portion thereof), VPS manager 350, and EKF manager 360 (and/or a portion thereof are examples of such instructions.

In some implementations, the memory 326 can be any type of memory such as a random-access memory, a disk drive memory, flash memory, and/or so forth. In some implementations, the memory 326 can be implemented as more than one memory component (e.g., more than one RAM component or disk drive memory) associated with the components of the processing circuitry 320. In some implementations, the memory 326 can be a database memory. In some implementations, the memory 326 can be, or can include, a non-local memory. For example, the memory 326 can be, or can include, a memory shared by multiple devices (not shown). In some implementations, the memory 326 can be associated with a server device (not shown) within a network and configured to serve the components of the processing circuitry 320.

Figure 4:
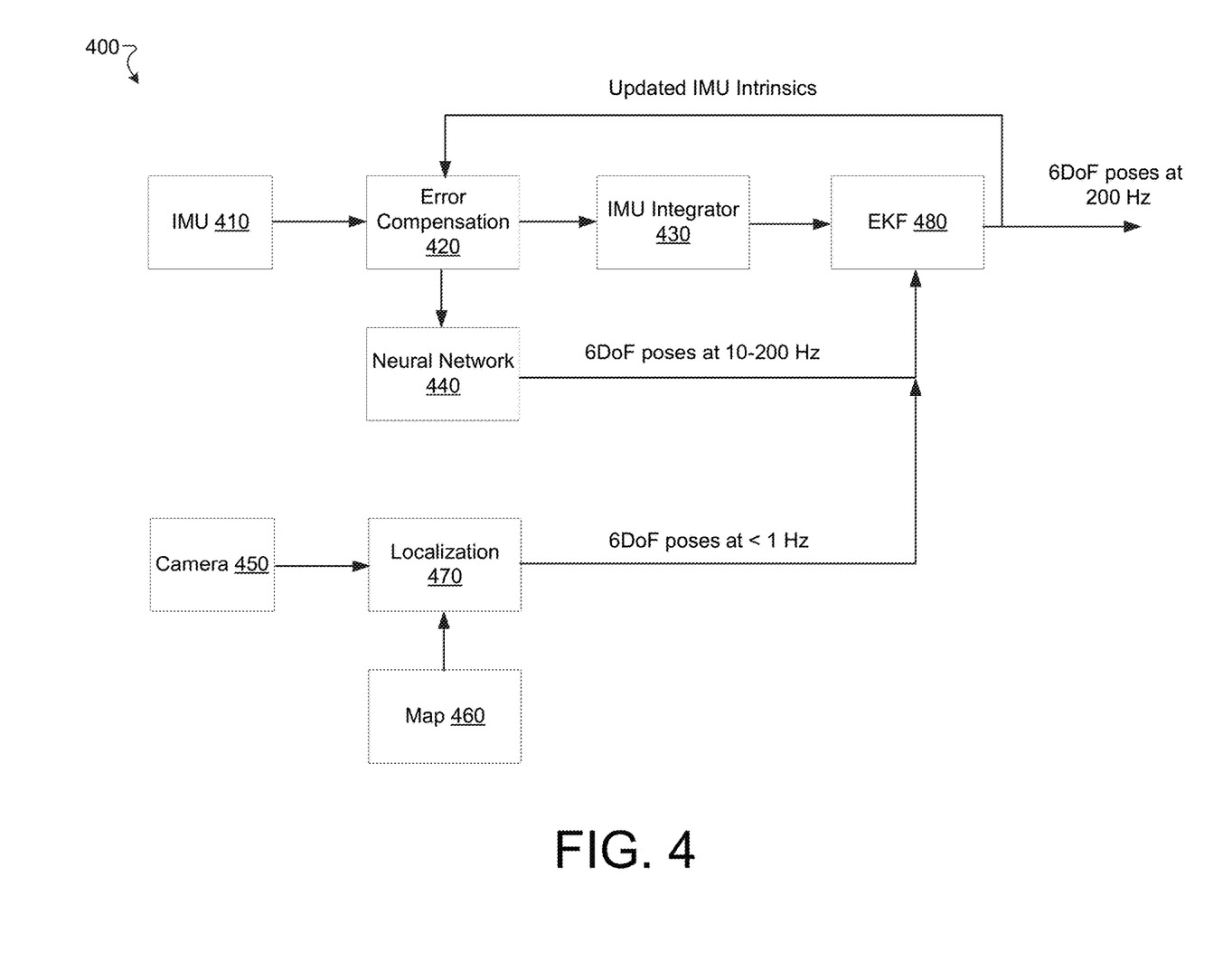
FIG. 4 is a flow chart illustrating an example flow for performing the map-aided inertial odometry.

FIG. 4 is a flow chart illustrating an example flow 400 for performing the map-aided inertial odometry. The flow 400 may be performed by software constructs described in connection with FIG. 3, which reside in memory 326 of the processing circuitry 320 and are run by the set of processing units 324.

At 410, the IMU measures a rotational velocity and acceleration at discrete instants of time. The IMU may also produce a temperature at the instant. These values may suffer increasing error as the time increases due to IMU drift.

At 420, an error compensation manager (e.g., error compensation manager 331) compensates the rotational velocity and acceleration values at the instants of time with error compensation values based on IMU intrinsic parameter values to produce error-compensated rotational velocity and acceleration values. The IMU intrinsic parameter values are elements of the state vector defined with respect to FIG. 3:

gyro bias $b_g$,
accelerometer bias $b_a$,
gyro scale factor $s_g$,
accelerometer scale factor $s_a$,
gyro misalignment $m_g$, and
accelerometer misalignment $m_a$.

At 430, an IMU integrator integrates the error-compensated rotational velocity and acceleration values to produce an integrated 6DoF pose and velocity. Specifically, the rotational velocity is accelerated once to produce an orientation, while the acceleration is integrated once to produce a velocity and once more to produce a position. The 6DoF pose and velocity are in a world frame.

The error compensation at 420 and integration at 430 occur frequently, e.g., at about 200 Hz.

At 440, a neural network module obtains the error-compensated rotational velocity and acceleration values as input into a convolutional neural network model to produce a second 6DoF pose and a second velocity. The neural network module may perform the neural network modeling and produce the first 6DoF pose and first velocity at a rate of 10-200 Hz. The first 6DoF pose provides constraints on human motion, as that constraint is reflected in the training data.

At 450, a world-facing camera (associated with the IMU) obtains images of a scene at a location, at a low frequency, e.g., <5 Hz.

At 460, a localization module obtains map data corresponding to the location of the scene.

At 470, the localization module uses a visual positioning system to determine world coordinates for a first 6DoF pose of the world-facing camera. The VPS provides an error boundary control to limit the spatial error in the second 6DoF pose.

At 480, the EKF takes in—at their respective frequencies—first 6DOF pose at 10-200 Hz and second 6DoF pose at <5 Hz. This implies at most, every second epoch has a VPS measurement—in most cases, every tenth epoch has a VPS measurement—while every epoch has a neural network measurement. The EKF then provides accurate estimates of the 6DoF pose at 200 Hz.

Figure 5:
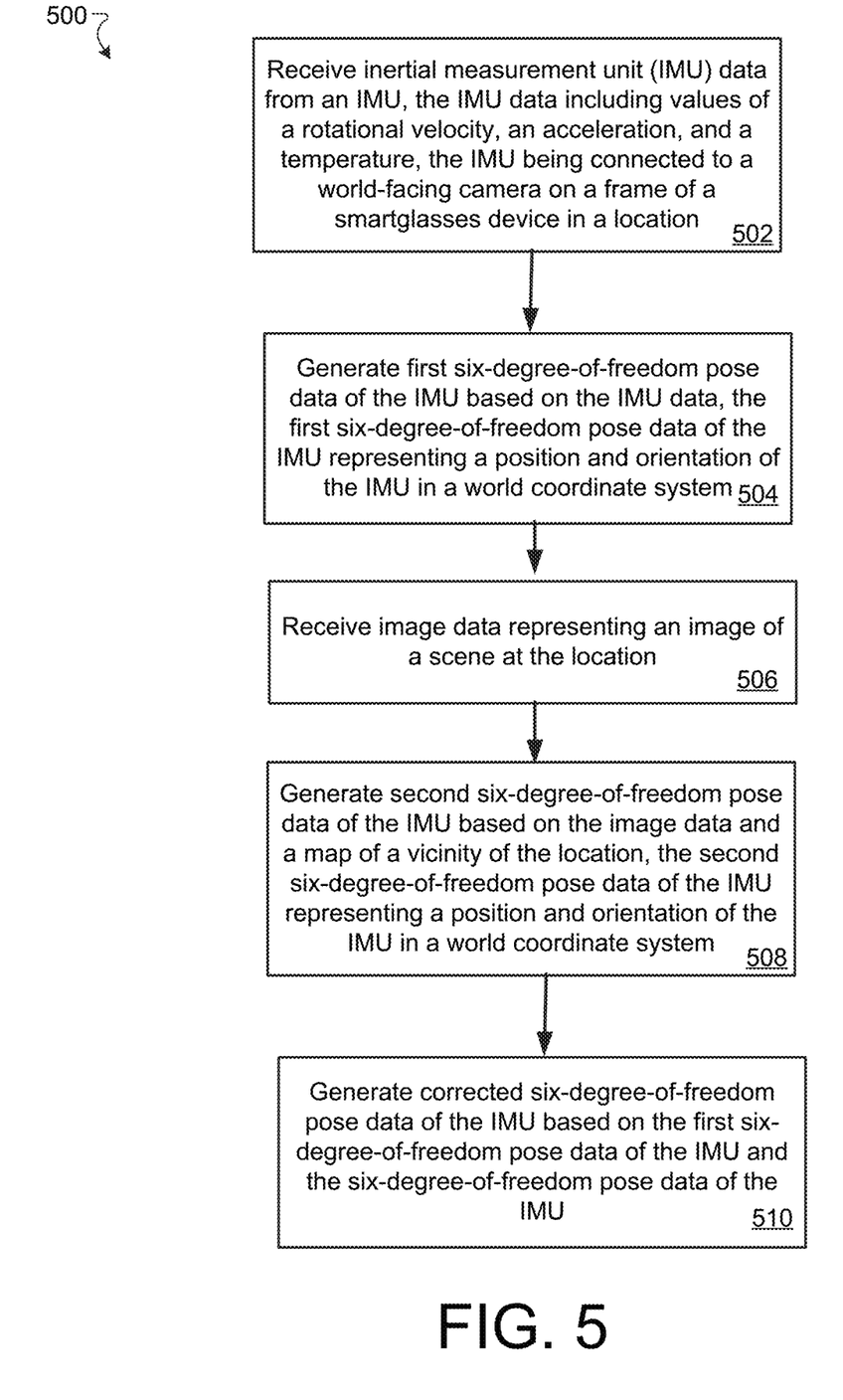
FIG. 5 is a flow chart illustrating a method for performing the map-aided inertial odometry per the improved techniques described herein.

FIG. 5 is a flow chart depicting an example method 500. The method 500 may be performed by software constructs described in connection with FIG. 3, which reside in memory 326 of the processing circuitry 320 and are run by the set of processing units 324.

At 502, the IMU manager (330) receives inertial measurement unit (IMU) data (IMU data 333) from an IMU, the IMU data including values of a rotational velocity (334) and an acceleration (335, the IMU being connected to a world-facing camera (116) on a frame (110) of a smartglasses device (100) in a location.

At 504, the neural network manager (340) generates first six-degree-of-freedom pose data (344, 346) of the IMU based on the IMU data, the first six-degree-of-freedom pose data of the IMU representing a position and orientation of the IMU in a world coordinate system.

At 506, the VPS manager (350) receives image data representing an image of a scene at the location.

At 508, the VPS manager generates second six-degree-of-freedom pose data (354, 356) of the IMU based on the image data and a map (e.g., scene 200) of a vicinity of the location, the second six-degree-of-freedom pose data of the IMU representing a position and orientation of the IMU in a world coordinate system.

At 510, the EKF manager (360) generates corrected six-degree-of-freedom pose data (370) of the IMU based on the first six-degree-of-freedom pose data of the IMU and the six-degree-of-freedom pose data of the IMU.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite example relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising:
    receiving inertial measurement unit (IMU) data from an IMU, the IMU being connected to a world-facing camera in a location;
    receiving image data representing an image of the location;
    generating first six-degree-of-freedom pose data based on the image data and a map of the location, the first six-degree-of-freedom pose data representing a first position and orientation of the IMU in a world coordinate system;
    generating second six-degree-of-freedom pose data based on the IMU data, the second six-degree-of-freedom pose data representing a second position and orientation of the IMU in the world coordinate system; and
    generating corrected six-degree-of-freedom pose data based at least on the first six-degree-of-freedom pose data and the second six-degree-of-freedom pose data.

2. The method as in claim 1, further comprising:
    processing the first six-degree-of-freedom pose data and the second six-degree-of-freedom pose data with a Kalman filter.

3. The method as in claim 2, wherein a state of the Kalman filter includes values of intrinsic parameters of the IMU; and
    wherein the values of the intrinsic parameters of the IMU at an update of the state of the Kalman filter are processed with an error compensation module configured to compensate IMU output to produce the IMU data.

4. The method as in claim 3, wherein the values of the intrinsic parameters include values of biases, misalignments, and scale factors of a gyro and an accelerometer of the IMU.

5. The method as in claim 1, wherein the image data is received at a rate of less than 5 Hz.

6. The method as in claim 1, wherein generating the second six-degree-of-freedom pose data includes:
    processing the IMU data with a convolutional neural network, the second six-degree-of-freedom pose data being an output of the convolutional neural network.

7. The method as in claim 6, wherein generating the second six-degree-of-freedom pose data occurs at least ten times more often than generating the first six-degree-of-freedom pose data.

8. A computer program product comprising a nontransitory storage medium, the computer program product including code that, when executed by processing circuitry, causes the processing circuitry to perform a method, the method comprising:
    receiving inertial measurement unit (IMU) data from an IMU, the IMU being connected to a world-facing camera in a location;
    receiving image data representing an image of the location;
    generating first six-degree-of-freedom pose data based on the image data and a map of the location, the first six-degree-of-freedom pose data representing a first position and orientation of the IMU in a world coordinate system;
    generating second six-degree-of-freedom pose data based on the IMU data, the second six-degree-of-freedom pose data representing a second position and orientation of the IMU in the world coordinate system; and
    generating corrected six-degree-of-freedom pose data of the IMU based on the first six-degree-of-freedom pose data and the second six-degree-of-freedom pose data.

9. The computer program product as in claim 8, wherein the method further comprises:
processing the first six-degree-of-freedom pose data and the second six-degree-of-freedom pose data with a Kalman filter.

10. The computer program product as in claim 9, wherein a state of the Kalman filter includes values of intrinsic parameters of the IMU; and
wherein the values of the intrinsic parameters of the IMU at an update of the state of the Kalman filter are processed with an error compensation module configured to compensate IMU output to produce the IMU data.

11. The computer program product as in claim 10, wherein the values of the intrinsic parameters include values of biases, misalignments, and scale factors of a gyro and an accelerometer of the IMU.

12. The computer program product as in claim 8, wherein the image data is received at a rate of less than 5 Hz.

13. The computer program product as in claim 8, wherein generating the second six-degree-of-freedom pose data includes:
processing the IMU data with a convolutional neural network, the second six-degree-of-freedom pose data being an output of the convolutional neural network.

14. The computer program product as in claim 13, wherein generating the second six-degree-of-freedom pose data occurs at least ten times more often than generating the first six-degree-of-freedom pose data.

15. An apparatus, comprising:
memory; and
processing circuitry coupled to the memory, the processing circuitry being configured to:
receive inertial measurement unit (IMU) data from an IMU, the IMU being connected to a world-facing camera in a location;
receive image data representing an image of the location;
generate first six-degree-of-freedom pose data based on the image data and a map of the location, the first six-degree-of-freedom pose data representing a first position and orientation of the IMU in a world coordinate system;
generate second six-degree-of-freedom pose data based on the IMU data, the first six-degree-of-freedom pose data of the IMU representing a second position and orientation of the IMU in the world coordinate system; and
generate corrected six-degree-of-freedom pose data based on the first six-degree-of-freedom pose data and the second six-degree-of-freedom pose data.

16. The apparatus as in claim 15, wherein the processing circuitry is further configured to:
process the first six-degree-of-freedom pose data and the second six-degree-of-freedom pose data with a Kalman filter.

17. The apparatus as in claim 16, wherein a state of the Kalman filter includes values of intrinsic parameters of the IMU; and
wherein the values of the intrinsic parameters of the IMU at an update of the state of the Kalman filter are processed with an error compensation module configured to compensate IMU output to produce the IMU data.

18. The apparatus as in claim 17, wherein the values of the intrinsic parameters include values of biases, misalignments, and scale factors of a gyro and an accelerometer of the IMU.

19. The apparatus as in claim 15, wherein the image data is received at a rate of less than 5 Hz.

20. The apparatus as in claim 15, wherein the processing circuitry configured to generate the second six-degree-of-freedom pose data is further configured to:
process the IMU data with a convolutional neural network, the second six-degree-of-freedom pose data being an output of the convolutional neural network.

21. The apparatus as in claim 20, wherein generating the second six-degree-of-freedom pose data occurs at least ten times more often than generating the first six-degree-of-freedom pose data.

22. The method as in claim 1, wherein the map of the location is based on a visual positioning system.

* * * * *